Sept. 17, 1968 J. BAECKLUND 3,402,292
APPARATUS FOR X-RAY ANALYSIS OF A MATERIAL HAVING A SPECIFIC
FILTER IN THE PRIMARY X-RAY BEAM PATH
Filed June 2, 1964 2 Sheets-Sheet 1

United States Patent Office 3,402,292
Patented Sept. 17, 1968

3,402,292
APPARATUS FOR X-RAY ANALYSIS OF A MATERIAL HAVING A SPECIFIC FILTER IN THE PRIMARY X-RAY BEAM PATH
Johannes Baecklund, Bro, Sweden
Filed June 2, 1964, Ser. No. 372,049
Claims priority, application Sweden, June 7, 1963, 6,339/63
2 Claims. (Cl. 250—51.5)

The present invention relates to apparatus for examining a material by means of X-rays in order to determine what elements are present in the material, as well as the concentrations in which the elements are present.

Such apparatus are previously known which comprise an X-ray tube for irradiating a sample of the material with primary X-rays, means for spectral resolution of the secondary radiation of the sample, and a radiation sensitive detector for measuring the intensity of the secondary radiation of a given wavelength. The measuring is based on the fact that the intensity of the so-called fluorescent radiation contained in the secondary radiation of a substance is a single-valued function of the content of the substance in question in the material examined. However, this fluorescent radiation is present superposed on a non-desirable background radiation contained in the secondary radiation and constituted in part by so-called scattered radiation caused by a small portion of the primary radiation incident upon the sample material being scattered in all directions from the sample. This latter portion of the background radiation has wavelength distribution equal to that of the radiation incident upon the sample. The background radiation, therefore, will normally exhibit high intensity peaks caused by the characteristic spectral lines of the X-ray tube anode. Now, if the wavelength of the fluorescent radiation from the specimen being examined should approach or coincide with said characteristic line, then it will be seen that the useful fluorescent radiation will be superposed on a relatively large amount of background radiation, and this would affect the accuracy of the measurements. It has been common practice hithertofore, in order to avoid an excessive background radiation during the individual analyses to change the X-ray tube and use tubes with different anode materials for carrying out different analyses.

It was established in connection with the present invention that the magnitude of the background radiation is highly dependent on the surface structure of the material being examined, and that the grinding of the test surfaces commonly undertaken in the past is insufficient to ensure a reproducible background radiation. As a matter of fact, measurements carried out on ground surfaces, on mechanically lapped surfaces, and on electrolytically finished surfaces have shown that the background radiation of the ground surfaces varies largely between the individual grindings, as compared to the background radiation from more fine-finished test surfaces. A sample surface finish of this degree of accuracy, however, will be extremely expensive since every individual sample would have to be subject to it.

The present invention has for its object to improve the conventional measuring apparatus so as to enable material analyses to be carried out with sufficient accuracy even on samples having a merely ground surface, as well as to enable the employment, in certain cases, of one single X-ray tube for various analyses of a kind which, up till now, have required the tube to be interchanged.

This result is accomplished, according to the invention, by interposing in the path of the primary rays between the X-ray tube and the material being examined a filter having high absorptivity for said given wavelength and low absorptivity within a range of wavelengths representing shorter wavelengths than said given wavelength. Owing to the absorption characteristics of the filter material chosen, the filter will heavily suppress the scattered radiation within the range of wavelengths containing the fluorescent spectral line being measured, whereas the shorter-wavelength radiation causing the fluorescent radiation will be only slightly suppressed. This will cause a substantial increase of the signal-to-background ratio.

Where analyses in respect of several different substances are to be carried out using one single apparatus, the filter interposed between the X-ray tube and the material to be examined is suitably arranged to be interchanged for one or more other filters, it being possible to carry out the switching in and out of the different filters automatically by the use of a device which is controlled by the means for selecting the secondary wavelength, whereby the setting of a given wavelength will always correspond to the switching of a predetermined filter into the path of the primary rays.

The invention will be explained more in detail in conjunction with the accompanying drawings, in which.

Figure 1:
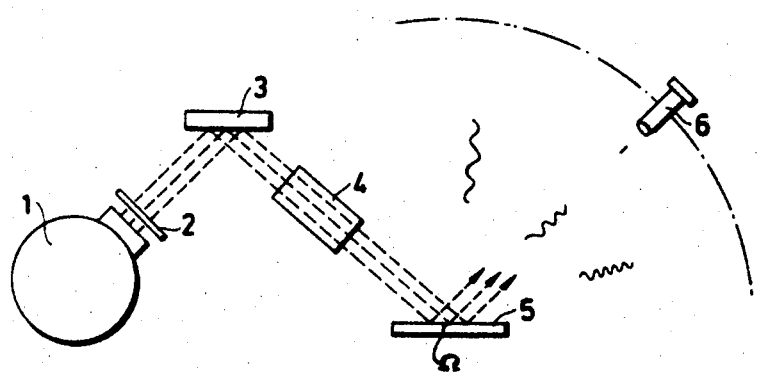
FIGURE 1 is a diagrammatic view of an X-ray spectrometer provided with a filter in accordance with the invention.

In FIGURE 1, numeral 1 designates an X-ray tube having a chromium anode and adapted, through the intermediary of a filter 2 comprised in a filter set and positioned in front of the exit window of the source of radiation, to irradiate a sample or specimen 3 with primary X-rays. At the sample, the incident radiation is subject to scattering as well as to absorption, and as a consequence of the primary radiation received, the sample emits a secondary radiation having an appearance characteristic of the composition of the sample, so-called fluorescent radiation. The wavelength distribution of the scattered radiation is approximately equal to that of the incident radiation, whereas the fluorescent radiation contains a number of given, definite wavelengths, so-called lines, there being, as a rule, two such lines in respect of each element contained in the sample. The intensity of each such line is a measure of the quantity of the corresponding element contained in the specimen. The secondary radiation, constituted by the useful fluorescent radiation plus the non-desirable background radiation, the latter consisting essentially of the scattered radiation, is caused through the intermediary of a collimator 4 serving for delimiting and screening off the secondary beam, to fall upon a crystal 5 of known diffraction grating constant, this crystal separating the radiation according to its wavelengths and emitting each wavelength in a definite direction. The radiation emitted from the crystal 5 is sensed by a radiation sensitive detector or sensor 6 which is angularly displaceable about the axis $\phi$. At the same time as the sensor is rotated about the axis $\phi$, the crystal wafer 5 is rotated about the same axis at an angular rate which is half that of the sensor, whereby the angle of incidence and the angle of reflection of the radiation received by the sensor will always be equal in magnitude. Thus it will be possible, by angularly displacing the sensor 5 while observing its output signal, to determine the substances contained in the specimen as well as the contents of these substances therein.

Figure 2:
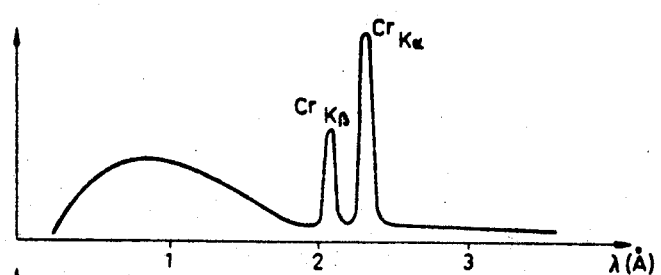
FIGURES 2 to 6 show some graphical representations adapted to explain the function of the filter.
Figure 3:
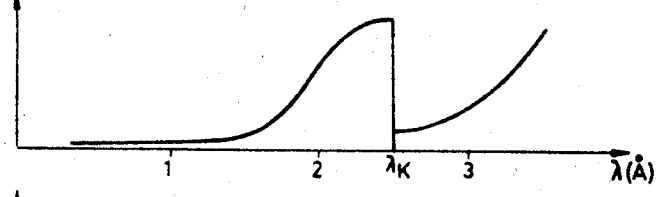
Figure 4:
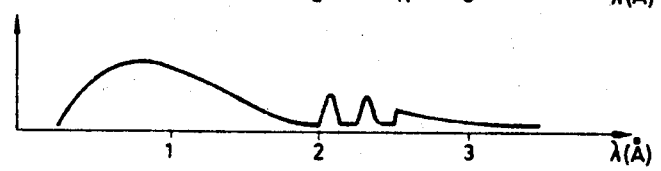

The function of the filter 2 which, in accordance with the invention, is disposed in front of the exit window of the source of radiation, is illustrated by the plots shown in FIGS. 2 to 6, inclusive. FIG. 2 illustrates the wavelength distribution of the primary radiation emitted from the X-ray tube to the filter. The scattered radiation from the specimen, on which scattered radiation the useful fluorescent radiation is superposed, as mentioned hereinbefore, has approximately the same wavelength distribution as that of the radiation incident upon the specimen and, therefore, in the absence of a filter in the path of the primary X-rays, would have substantially the appearance illustrated in FIG. 2. Such a wavelength distribution is particularly unfavorable, for example, where the chromium content of a steel specimen is to be determined, since, when using an X-ray tube with a chromium anode, the background radiation has a high-intensity peak just at the chromium line ($K_a$) which is to be measured to determine the chromium content. In this case, according to the present invention, there is disposed at the exit window of the source of radiation a titanium filter having an absorption curve (absorption plotted as a function of wavelength) as shown in FIG. 3. The titanium filter, as will appear from the figure, has its absorption edge $\lambda_k$ displaced relative to the chromium line $K_a$ by a small amount in the direction of increasing wavelengths, thereby effecting great absorption within the wavelength range where the $K_a$- and $K_\beta$-lines for chromium appear. The titanium filter thereby will act to reduce the scattered radiation or background radiation within this range, whereas the shorter-wavelength primary radiation effecting fluorescence in the specimen will be passed by the filter without any noticeable attenuation thereof. The wavelength distribution of the primary radiation leaving the titanium filter is shown in the graph of FIG. 4. In addition to being used for chromium analysis, the titanium filter may be employed in determining any presence and content of several other substances in the steel specimen.

Figure 5:
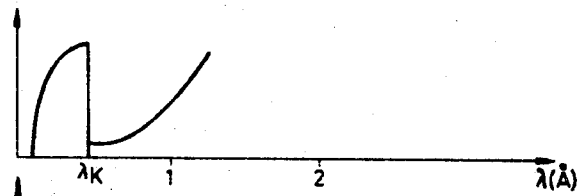
Figure 6:
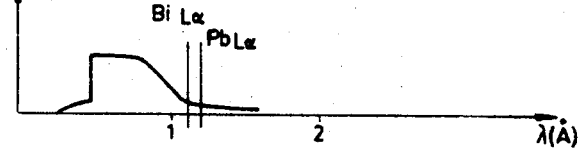

If, instead of chromium, it is desired to examine the steel specimen in respect of its content of, for example, lead, tantalum or bismuth, the characteristic spectral lines of which are situated at wavelengths where the titanium filter has practically no absorption, then the titanium filter at the exit window of the source of radiation may be replaced by a tin filter the absorption curve (absorption as a function of wavelength) of which is shown in FIG. 5. The wavelength distribution of the radiation obtaining after filtering by the tin filter is shown in FIG. 6 in which the $L_a$-lines for lead and bismuth are also inserted. In this case it is seen that, as opposed to the preceding case, the absorption edge $\lambda_k$ of the filter material is displaced relative to the fluorescence line being measured in the direction of decreasing wavelengths. More particularly, the absorption edge is displaced in the direction of decreasing wavelengths by an amount such that the major portion of the primary radiation exciting said fluorescent radiation will fall within the wavelength range disposed immediately beyond the absorption edge, as seen in the direction of increasing wavelengths. In this range the absorption in the filter material is unnoticeable, whereas said fluorescence lines are disposed within a range where the absorption has again arisen to a substantial value. As in the preceding case, the result will be that the background radiation within the range comprising the useful fluorescent radiation will be greatly suppressed, whereas the primary radiation exciting the fluorescence will be passed with a relatively unnoticeable attenuation.

Determinative of which filter to be switched in, according to the discussion just carried out, will be locality of the fluorescence line selected to be measured by the radiation sensitive detector or sensor. Such selection is carried out by angularly displacing the radiation sensitive detector or sensor 6, and it is suitable, therefore, to control the switching in of different filters automatically in response to the angular displacement of the radiation sensitive detector or sensor.

Figure 7:
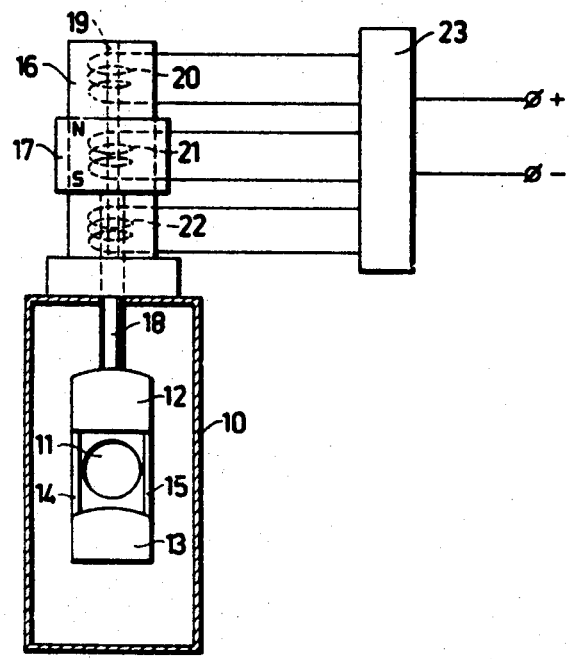
FIGURE 7 is a side elevation of a source of radiation provided with a filter changer.

One arrangement for automatically switching in two different filters, being for instance the above-mentioned titanium and tin filters adapted for the examination of steel specimens, is illustrated in FIG. 7 in which numeral 10 designates the envelope of the X-ray tube, and numeral 11 denotes the exit window for the primary X-rays. Numerals 12 and 13 designate the two filters which are interconnected by two lateral connecting strips 14, 15 and adapted to be operated by means of a permanent magnet 17 rigidly connected to one filter 12 and slidable along a guide column 16. Extending within the guide column 16 is a rod 19 made of a ferro-magnetic material and carrying three coils 20, 21, 22 uniformly spaced along the guide column. Between the coils and at the outer ends of the end coils magnetic-flux conductors extend from the central rod 19 to the periphery of the guide column 16 and serve to close the magnetic flux paths. Thus by suitably exciting the coils 20, 21 and 22, the permanent magnet 17 carrying the filter set 12, 13 can be moved into any desired one of three possible positions, these being either a top position in which the filter 13 covers the exit window 11, the position illustrated with both filters removed from the exit window, or a bottom position with the filter 12 covering the exit window. The excitation of coils 20, 21, 22 is controlled from a switching unit 23 controlled by the actuator mechanism serving for angularly displacing the sensor 6, whereby any angular position of the sensor 6 corresponds to a definite state of excitation of the coils 20 to 22, and thus to a definite setting of the filter set comprising the filters 12, 13. This filter set, of course, may contain other filters than those referred to, and/or more than two filters, dependent on the nature of the analysis desired, and the switching of the filters may be operated in any suitable way.

What is claimed is:
1. An apparatus for carrying out X-ray analysis of a material for the purpose of determining the presence and concentration of at least one element which comprises;
 (a) an X-ray tube for irradiating said material with primary X-rays;
 (b) means for the spectral division of the secondary X-radiation emitted by said material;
 (c) a radiation sensor for measuring the band of wavelengths of secondary X-radiation including the wavelengths emitted by said element and divided from said secondary X-radiation emitted by said material by said means for spectral division; and
 (d) at least one filter interposed in the path of said primary X-rays between said X-ray tube and said material having a high absorptivity for said band of wavelengths of secondary X-radiation including the wavelengths emitted by said element and low absorptivity for wavelengths of said primary X-rays which induce said secondary X-radiation emitted by said element.

2. An apparatus for carrying out X-ray analysis of a material for the purpose of determining the presence and concentration of at least two elements in said material which comprises;
 (a) an X-ray tube for irradiating said material with primary X-rays;
 (b) a crystal for the spectral division of the secondary X-radiation emitted by said material;
 (c) a radiation sensor for measuring each of the two bands of wavelengths of secondary X-radiation including the wavelengths emitted by each of said two elements, respectively, and divided from said secondary X-radiation emitted by said material by said crystal;
 (d) said sensor being angularly displaceable into at least two angular positions relative to said crystal for the purpose of measuring each of said two bands of wavelengths of secondary X-radiation, respectively;
 (e) a first filter interposed in the path of said primary X-rays between said X-ray tube and said material, having high absorptivity for said band of wavelengths of secondary X-radiation including the wavelengths emitted by one of said elements and low absorptivity for wavelengths of said primary X-rays which induce said secondary X-radiation emitted by said one element;

(f) a second filter interchangeable with said first filter, having high absorptivity for said band of wavelengths of secondary X-radiation including the wavelengths emitted by the other of said elements and low absorptivity for wavelengths of said primary X-rays which induce said secondary X-radiation emitted by said other element; and (g) means for automatically interchanging said first and second filters depending upon the angular position of said sensor relative to said crystal.

References Cited

UNITED STATES PATENTS

| 3,079,499 | 2/1963 | Long | 250—51.5 |
| 3,218,458 | 11/1965 | Furnas | 250—51.5 |

OTHER REFERENCES

"The Encyclopedia of X-Rays and Gamma Rays," edited by G. L. Clark, Reinhold Publishing Corp., New York, 1963, pp. 387–392.

WILLIAM F. LINDQUIST, *Primary Examiner.*